Figure 1:
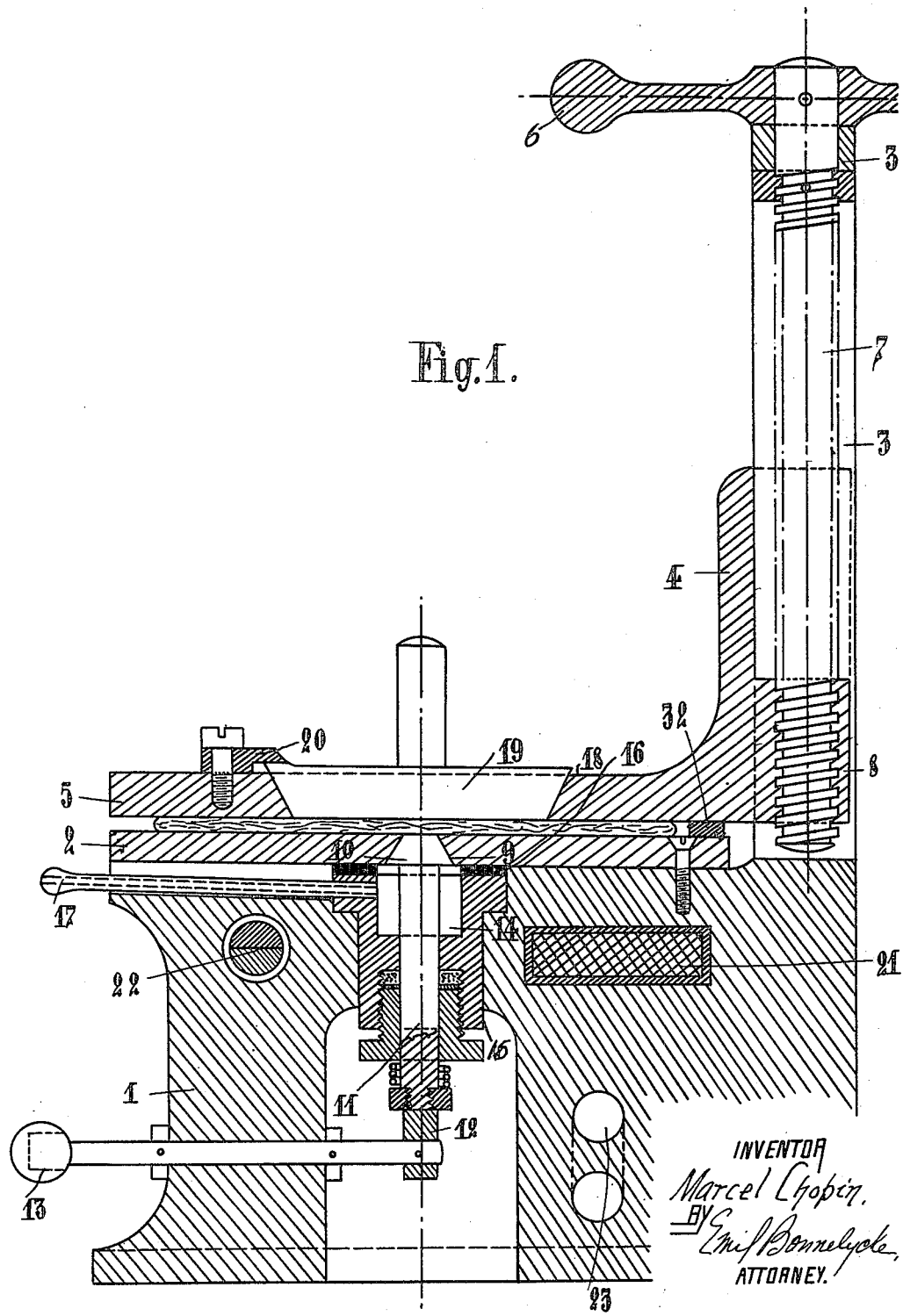

Sept. 25, 1923.

M. CHOPIN 1,468,900

PROCESS AND APPARATUS FOR MEASURING THE ELASTIC PROPERTIES OF PLASTIC
MATERIALS, FARINACEOUS PASTES, AND THE LIKE

Filed Sept. 22, 1921   2 Sheets-Sheet 1

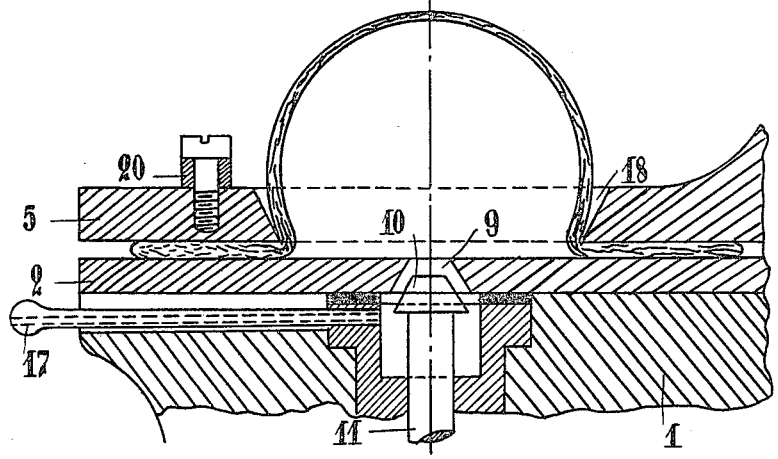
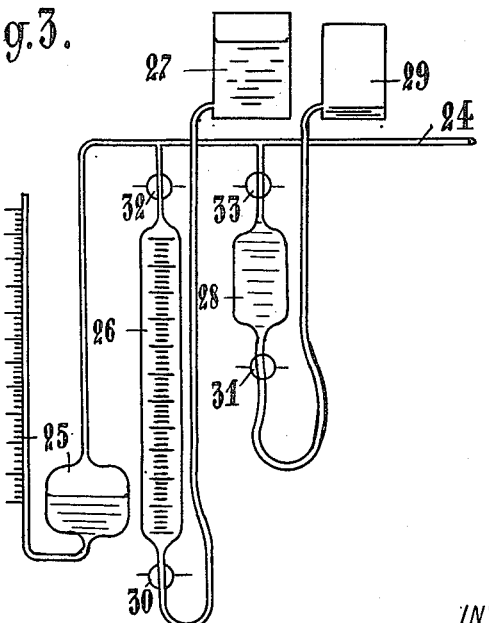

Patented Sept. 25, 1923.

1,468,900

UNITED STATES PATENT OFFICE.

MARCEL CHOPIN, OF NANCY, FRANCE, ASSIGNOR TO HIMSELF AND SOCIETE D'ENTRE-PRISE MEUNIERE, OF PARIS, FRANCE, A FRENCH COMPANY.

PROCESS AND APPARATUS FOR MEASURING THE ELASTIC PROPERTIES OF PLASTIC MATERIALS, FARINACEOUS PASTES, AND THE LIKE.

Application filed September 22, 1921. Serial No. 502,546.

*To all whom it may concern:*

Be it known that I, MARCEL CHOPIN, citizen of the Republic of France, and resident of Nancy, France (post-office address 31 Rue du Bastion), have invented a new and useful Process and Apparatus for Measuring the Elastic Properties of Plastic Materials, Farinaceous Pastes, and the like, which improvements are fully set forth in the following specification.

The present invention relates to a method of and apparatus for measuring the elastic properties of plastic materials. Applied to floury pastes the apparatus enables the determination of the baking value of the particular flour under treatment and also the expansion of the paste or dough of this flour in the course of panification and the yield of bread obtainable therefrom.

The essential function of the fermentation of flour suitable for bread making is to divide the dough into cells filled with carbon dioxide and bounded by membranes of dough. This division is effected the more easily the more the dough is able to elongate in the form of a thin membrane.

Moreover at the beginning of baking the risen dough undergoes a final increase in volume which is the greater in proportion as the membranes of the cells are able to stretch more fully without breakage.

The invention relates also to a method of determining the quality of flour dough and other plastic materials, by extracting from the paste a membrane strip or section analogous to that forming the cells of the crumb of the bread. This strip is subjected, under predetermined experimental conditions, to continuous tension up to the point of rupture. The surface of the strip is in proportion to what may be called the "coefficient of distension" of the paste or dough. The practical importance of this measurement results from the following observations.

Measurements were made with the apparatus hereinafter described of the coefficient of distension of the various doughs obtained with very different flours; and on the other hand these flours were used under predetermined conditions of panification for producing loaves the specific volume of which was then measured.

The following relation was obtained:—

The difference between the volume of the bread and the initial volume of the farinaceous dough forming the loaf is found to be in proportion to the square root of the coefficient of distension of said dough.

On the other hand it has been found that a farinaceous dough prepared with a constant percentage of water possesses a tenacity which is characteristic of the capacity which this form of flour has for absorbing the water in kneading. This tenacity may be measured for example by measuring the effort required to distort a test piece of the dough under constant conditions. The yield in bread is the greater, in proportion as the flour is more able to absorb water in kneading; and in proportion as the dough from this flour, prepared with a constant percentage of water, possesses a higher tenacity measured by the aid of a suitable apparatus. It is thus possible to predetermine exactly the baking value of a flour from the double point of view of rising and the yield of bread without having recourse to a long trial baking, the result of which is often uncertain.

The accompanying drawing shows by way of example an apparatus constructed for the practical application of the foregoing data.

In said drawing;

Fig. 1 is a vertical section of the apparatus,

Fig. 2, a section of a detail of said apparatus,

Fig. 3 is a diagrammatic view of the registering and measuring apparatus.

The hereinafter described apparatus enables a sample of the dough to be formed into a test piece of predetermined shape and to be developed into a cell analogous to those in the crumb of the loaf but of sufficient dimensions to allow the following measurements to be made:—

*a.* The measurement of the tenacity of the material expressed by the effort needed to produce a predetermined deformation in a constant period.

*b.* The measure of the maximum distension capable of being sustained by this test piece when subjected to a continuous and constant stress until the membrane of said test piece is ruptured.

In Fig. 1, 1 indicates a metal base, surmounted by a horizontal plate 2 of circular shape. This base supports a vertical column 3 on which slides a shoe 4 to which is fixed a second circular plate 5. By turning the hand wheel 6, this plate 5 can be moved in a direction parallel to the plate 2 by means of a screw 7 and the screw thread 8 on the shoe 4.

The centre of the plate 2 is provided with a frusto-conical opening 9 which is adapted to be closed by a valve 10 of the same shape carried by the stem 11. The longitudinal travel of this stem is assured by the rotation of the eccentric 12 carried by the exterior handle 13. The chamber 14 is made tight by the stuffing box 15 and joint 16. This chamber may be connected, by means of the tube 17, to the instruments shown in Fig. 3.

The movable plate 5 is also pierced by a frusto-conical opening 18, the centre of which is situated on the axis of symmetry of the valve 10. The opening 18 may also be closed by means of a stopper or plug 19 of the same shape, kept in place by means of three turnscrews such as 20.

As experience has shown that the experiments must be carried out at a constant temperature, the base contains an electric heating resistance 21, controlled by a temperature regulator 22; finally a coil 23 is provided which may be traversed by a current of cold water to ensure the final cooling of the apparatus. The members 21, 22, 23 are housed in recesses provided in the base itself.

The measuring and registering instruments shown in Fig. 3 comprise a tube 24 connected to the tube 17, from which tube 24 the following devices branch:—a water gauge 25; a narrow receiver 26 graduated in cubic centimetres and connected to an operating flask 27; and a receiver 28 of smaller capacity connected to a second operating flask 29.

The receivers 26, 27, 28 and 29 contain water or mercury and are in mutual communication. 30, 31, 32 and 33 are cocks.

The tests are carried out in the following manner:—

A sample of flour is kneaded with a constant percentage of water in as uniform a manner as possible until a homogeneous dough has been obtained which is then cut into pieces of uniform shape. The valve 10 and plug 19 having been secured in their respective seats and the plate 5 having been raised, one of these test pieces is placed on the centre of the plate 2, the plate 5 being then lowered until it abuts against a stop 32. The plug 19 is thereupon raised and the valve 10 lowered. The test piece may then be regarded as divided into two zones, the central zone having the form of a disc of predetermined dimensions (which forms the actual test piece for the measurements and which is adapted to be displaced upwardly) and the other or peripheral zone being held between the two plates and serving to hold the test piece.

The following measurements may now be made by means of the receiver 28 and its operating flask 29:—A constant volume of gas is introduced beneath the test piece; the dough rises from the lower plate and assumes a well defined curvature shown in Fig. 2. The maximum pressure registered by the gauge during this movement gives the measurement of the tenacity of the dough. The cock 33 is then closed and the cocks 30 and 32 are opened. By means of the receiver 26 and the operating flask 27 the membrane of dough is progressively distended and assumes the shape of a hemisphere, the walls of which become thinner as the radius increases. The cock 30 is closed at the moment of rupture of the membrane.

The volume of water formed in the measuring vessel 26 added to a volume of water found in vessel 28 forms a measure of the total volume of gas used, and from this the superficial area of the membrane at the moment of fracture can be deduced. The hereinbefore described apparatus thus enables a test piece of standardized dimensions to be prepared from the material under examination, and such test piece to be subjected to stress, the law of variation of which—as a function of the time taken up by the flow of liquid between the communicating vessels—remains invariable in all the tests.

Moreover, by reason of the test piece being held around its entire perimeter and, by the uniform distribution of the stress over the surface of the test piece, premature rupture of the latter along the line of attachment is only of very rare occurrence.

The tests may be carried out either on the flour dough or on the gluten extracted from this flour, or even on the flour obtained from the wheat or mixture of wheat which it is proposed to mill, for the purpose of predetermining the baking value of the flours furnished by such wheat. Finally the apparatus is equally applicable to the measuring of elastic or plastic substances such as caoutchouc.

In order to facilitate the operations the glass measuring vessel 26 may be graduated in degrees of the distension of dough, these graduations being made in accordance with the square roots of the corresponding volumes. In the same way the graduation of the pressure gauge may be made in percentage of the quantity of water to be added to the flour in order to obtain the best kneading effect.

In place of measuring the volume of air which effects the rupture of the dough balloon it is equally possible to detach a fragment of the membrane at the zone of rupture and, after drying this membrane, to measure its thickness. This limit of thickness of membrane which the dough will give is also a function of the panification value of the flour.

It should be understood that the invention is not restricted to the hereinbefore described apparatus but relates also to any other form of instruments allowing tests to be made on flour dough test pieces of predetermined shape and the same to be distended so as to produce a fine membrane, and deductions to be made, from the dimensions of this membrane of the degree of distension such flour may attain in the course of bread making; or again of apparatus enabling the tenacity of the dough obtained with a constant percentage of water to be determined by deducing the percentage of water the flour is able to absorb in kneading.

What I claim and desire to secure by Letters Patent is:—

1. A method of determining the breadmaking values of flours, comprising the steps of preparing a dough of the flour to be tested, in which a certain definite percentage of the dough is water, forming a layer of such dough of predetermined thickness, distending the layer to the point of rupture, and registering the tension at the moment of rupture; substantially as described.

2. A method of determining the breadmaking values of flours, comprising the steps of preparing a dough of the flour to be tested, in which a certain definite percentage of the dough is water, forming a layer of such dough of predetermined thickness, distending the layer to the point of rupture while maintaining the temperature constant, and registering the tension at the moment of rupture; substantially as described.

3. A method of determining the breadmaking values of flours, comprising the steps of preparing a dough of the flour to be tested, in which a certain definite percentage of the dough is water, forming a layer of such dough of predetermined shape and thickness, distending the layer to the point of rupture while maintaining the temperature constant, and registering the tension at the moment of rupture; substantially as described.

4. A method of determining the elastic properties of plastic materials, comprising the steps of compressing a specimen of the material to be tested to produce a test piece of predetermined form and of constant predetermined thickness, relieving the pressure upon a definite portion of the test piece while maintaining the pressure upon the remainder thereof, and thereafter subjecting such portion to tension to the rupture point and registering the tension at the moment of rupture; substantially as described.

5. A method of determining the elastic properties of flour doughs, comprising the steps of preparing a dough of a particular flour, in which a certain definite percentage of the dough is water, compressing a specimen of such dough to produce a test piece, and thereafter distending the test piece to the rupture point and registering the tension at the moment of rupture; substantially as described.

6. A method of determining the elastic properties of plastic materials, comprising the steps of compressing a specimen of the material to be tested to produce a test piece of predetermined form and of constant predetermined thickness, relieving the pressure upon a definite portion of the test piece while maintaining the pressure upon the remainder thereof, and thereafter distending such portion to a certain limit and registering the tension when said limit is reached; substantially as described.

7. A method of determining the breadmaking values of flours, comprising the steps of preparing a dough of the flour to be tested, in which a certain definite percentage of the dough is water, obtaining from such dough a test piece of predetermined form and thickness, subjecting a definite portion of the test piece to fluid pressure to distend and ultimately rupture the same, and registering the pressure at the moment of rupture; substantially as described.

8. Apparatus for determining the elastic properties of plastic materials, comprising means for forming a specimen of the material to be tested into a test piece of predetermined shape and thickness; means for directing fluid pressure against one surface of the test piece while under the control of said forming means to distend and ultimately rupture said test piece; and means in communication with the pressure fluid circuit to indicate the pressure at the moment of rupture.

9. Apparatus for determining the elastic properties of plastic materials, comprising means for forming a specimen of the material to be tested into a test piece of predetermined shape and thickness, said means including a member which is removable therefrom to expose a definite portion of the test piece; means for applying fluid pressure directly back of the exposed portion of the test piece to distend said portion; and means in communication with the pressure fluid circuit to indicate the extent of pressure applied.

10. Apparatus for determining the elastic properties of plastic materials, comprising a pair of coacting plates for compressing between them a specimen of the material to be tested, to form a test piece of predetermined thickness; means for applying fluid pressure against the test piece while held between said plates; and means in communication with the pressure fluid circuit to indicate the extent of pressure applied.

11. Apparatus for determining the elastic properties of plastic materials, comprising a pair of coacting plates for compressing between them a specimen of the material to be tested, to form a test piece of predetermined thickness, one plate having one part thereof removable to expose a corresponding portion of the test piece; means for applying fluid pressure directly back of the exposed portion of the test piece, to distend said portion through the opening formed consequent upon the removal of said removable part; and means in communication with the pressure fluid circuit to indicate the extent of pressure applied.

12. Apparatus for determining the elastic properties of plastic materials, comprising a pair of coacting plates for compressing between them a specimen of the material to be tested, to form a test piece of predetermined thickness; one plate having a frusto-conical opening therein to expose a corresponding portion of the test piece, and a frusto-conical plug removably fitting in said opening to close the same during the compressing operation; means for applying pressure directly back of said opening after the plug has been removed, to distend the exposed portion of the test piece through the opening; and means in communication with the pressure fluid circuit to indicate the extent of pressure applied.

13. Apparatus for determining the elastic properties of plastic materials, comprising a pair of coacting plates for compressing between them a specimen of the material to be tested, to form a test piece of predetermined thickness, one plate having a relatively-large opening therein to expose a corresponding portion of the test piece, and the other plate having a relatively-small opening therein located coaxial with the first opening, each opening having a removable closure which is adapted to be disposed therein during the compression operation and to be withdrawn at the completion thereof; means for supplying a pressure fluid through the small opening to distend the exposed portion of the test piece through the large opening; and means for indicating the extent of pressure applied against said portion.

14. Apparatus for determining the elastic properties of plastic materials, comprising means for forming a specimen of the material to be tested into a test piece of predetermined shape and thickness; means for applying fluid pressure against one surface of the completed test piece while under the control of said forming means to distend the same; means in communication with the pressure fluid circuit to indicate the extent of pressure applied; and means for maintaining a constant temperature in the apparatus during operation.

In testimony whereof I have signed this specification in the presence of two subscribing witnesses.

MARCEL CHOPIN.

Witnesses:
PAUL B. LONJUKERT.
ROBERT BUJAVAL,